(12) United States Patent
Storch et al.

(10) Patent No.: US 7,857,483 B2
(45) Date of Patent: Dec. 28, 2010

(54) SYSTEMS AND METHODS FOR A HIGH-INTENSITY LIGHT EMITTING DIODE FLOODLIGHT

(75) Inventors: David Robert Storch, Springfield, OH (US); Jeffrey M. Singer, Springfield, OH (US); David Barnett, Springfield, OH (US)

(73) Assignee: Honeywell International Inc., Morristown, NJ (US)

( * ) Notice: Subject to any disclaimer, the term of this patent is extended or adjusted under 35 U.S.C. 154(b) by 252 days.

(21) Appl. No.: 12/120,011

(22) Filed: May 13, 2008

(65) Prior Publication Data

US 2009/0284976 A1 Nov. 19, 2009

(51) Int. Cl.
*F21V 7/00* (2006.01)
*F21V 29/00* (2006.01)

(52) U.S. Cl. .................. 362/247; 362/249.02; 362/294; 362/800

(58) Field of Classification Search .................. 362/218, 362/249.02, 294, 800, 247
See application file for complete search history.

(56) References Cited

U.S. PATENT DOCUMENTS

| 6,452,217 | B1 | 9/2002 | Wojnarowski et al. | |
|---|---|---|---|---|
| 6,525,668 | B1 | 2/2003 | Petrick | |
| 7,048,412 | B2 * | 5/2006 | Martin et al. | 362/247 |
| 7,150,553 | B2 * | 12/2006 | English et al. | 362/545 |
| 7,205,719 | B2 | 4/2007 | Tain et al. | |
| 7,222,995 | B1 * | 5/2007 | Bayat et al. | 362/327 |
| 7,281,820 | B2 * | 10/2007 | Bayat et al. | 362/245 |
| 7,300,191 | B2 | 11/2007 | Oshio et al. | |
| 7,331,691 | B2 | 2/2008 | Livesay et al. | |
| 7,651,240 | B2 * | 1/2010 | Bayat et al. | 362/208 |
| 2007/0019432 | A1 * | 1/2007 | Shimada | 362/545 |

FOREIGN PATENT DOCUMENTS

| DE | 102007044740 A1 | 5/2008 |
|---|---|---|
| WO | 2004/097291 | 11/2004 |
| WO | 2005055328 A1 | 6/2005 |

* cited by examiner

*Primary Examiner*—Stephen F Husar
*Assistant Examiner*—James W Cranson
(74) *Attorney, Agent, or Firm*—Back Lowe & Graham PLLC

(57) ABSTRACT

Systems and methods for a high intensity light emitting diode ("LED") floodlight. The floodlight has a designed direction of output and includes an LED; an optical element; a blade; and a heat sink. The blade is mounted at an application-specific angle to the heat sink to obtain the designed direction of output. The blade has an LED and an optical element; and a fixed end coupled with the heat sink. The heat sink is configured to dissipate heat away from the LED on the blade. The blade is configured to activate the LED and using the optical element, redirect the light in the direction of the designed output of the floodlight.

7 Claims, 3 Drawing Sheets

SYSTEMS AND METHODS FOR A HIGH-INTENSITY LIGHT EMITTING DIODE FLOODLIGHT

BACKGROUND OF THE INVENTION

Some aerospace lighting applications require immense amounts of light to illuminate parts of the surrounding environment. A traditional lighting solution uses a large halogen lamp with an internal parabolic reflector. These lamps are fairly inefficient and require considerable quantities of electrical power to operate at the intended levels. Most of this power is radiated as heat and creates extremely high temperatures. These lamps must be isolated from other aircraft components so the heat does not interfere with other systems or injure maintenance personnel. Most importantly, halogen lights have a relatively short operating life and must be frequently replaced. Though the lamps themselves are not excessively expensive, replacing lamps involves maintenance time, which costs aircraft owners a significant amount due to aircraft downtime and labor.

A more recent solution for aerospace lighting utilizes High-Intensity Discharge ("HID") systems. Though HID lamps have a longer operating life than their halogen counterparts, they have higher costs than a standard halogen lamp. The HID systems also require warm-up time of several minutes and the lamps cannot be easily flashed or quickly started.

Light emitting diode (LED) technology can also be used in aerospace lighting applications. LED solutions often have an operating life far greater than halogen or HID lamps. LED solutions are more efficient than halogen solutions and typically require less electrical power. LEDs also have a variety of possible operating conditions, allowing intensity levels and flash rates that are not easily attainable with halogen and HID solutions. Traditional LED solutions utilize one or more arrays of LEDs on a planar configuration. This limits the number of LEDs that can fit in a given size and complicates thermal management. These factors are both important as aircraft mounting installations are generally sized for the halogen solution, and the ability to properly manage heat at the LED directly impacts both the life and intensity of the LEDs.

SUMMARY OF THE INVENTION

Systems and methods for a high intensity light emitting diode ("LED") floodlight are disclosed herein. The floodlight has a designed direction of output and includes an LED; an optical element; a blade; and a heat sink. The blade is mounted on the heat sink perpendicular to the designed direction of output. The blade has a free end with an LED and optic; and a fixed end coupled with the heat sink. The heat sink is configured to dissipate heat away from the LED located at the blade's free end. The blade is configured to activate the LED and, using the optic, redirect the light in the direction of the designed output of the floodlight.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Systems and methods for a high-intensity light emitting diode (LED) floodlight are disclosed herein. In one embodiment, the floodlight utilizes a right-angle reflector design which allows a plurality of LEDs to be mounted in a perpendicular orientation to the designed light output. The orientation advantageously allows for more LEDs to be mounted than in a standard planar LED solution. The LEDs are mounted onto circuit cards (blades) which allow the LEDs to be activated and powered. In an alternate embodiment, the LEDs may be mounted directly onto a heat spreader. The circuit cards are mounted directly onto a heat spreader material with a high thermal conductivity, which functions as a heat sink fin. The heat sink fin advantageously reduces LED temperatures and therefore results in longer life and higher intensity. Once heat enters the fin, it is conducted through the fin to the heat sink and convected through the surrounding air such that the heat is preferably dissipated to the ambient environment. Perpendicular reflectors are mounted onto the circuit boards. The perpendicular reflectors are configured to reflect the light in the designed direction of the floodlight. For example, when activated, the LEDs shine light perpendicular to the direction of the floodlight and the reflectors reflect the light in the direction of the floodlight.

Figure 1:
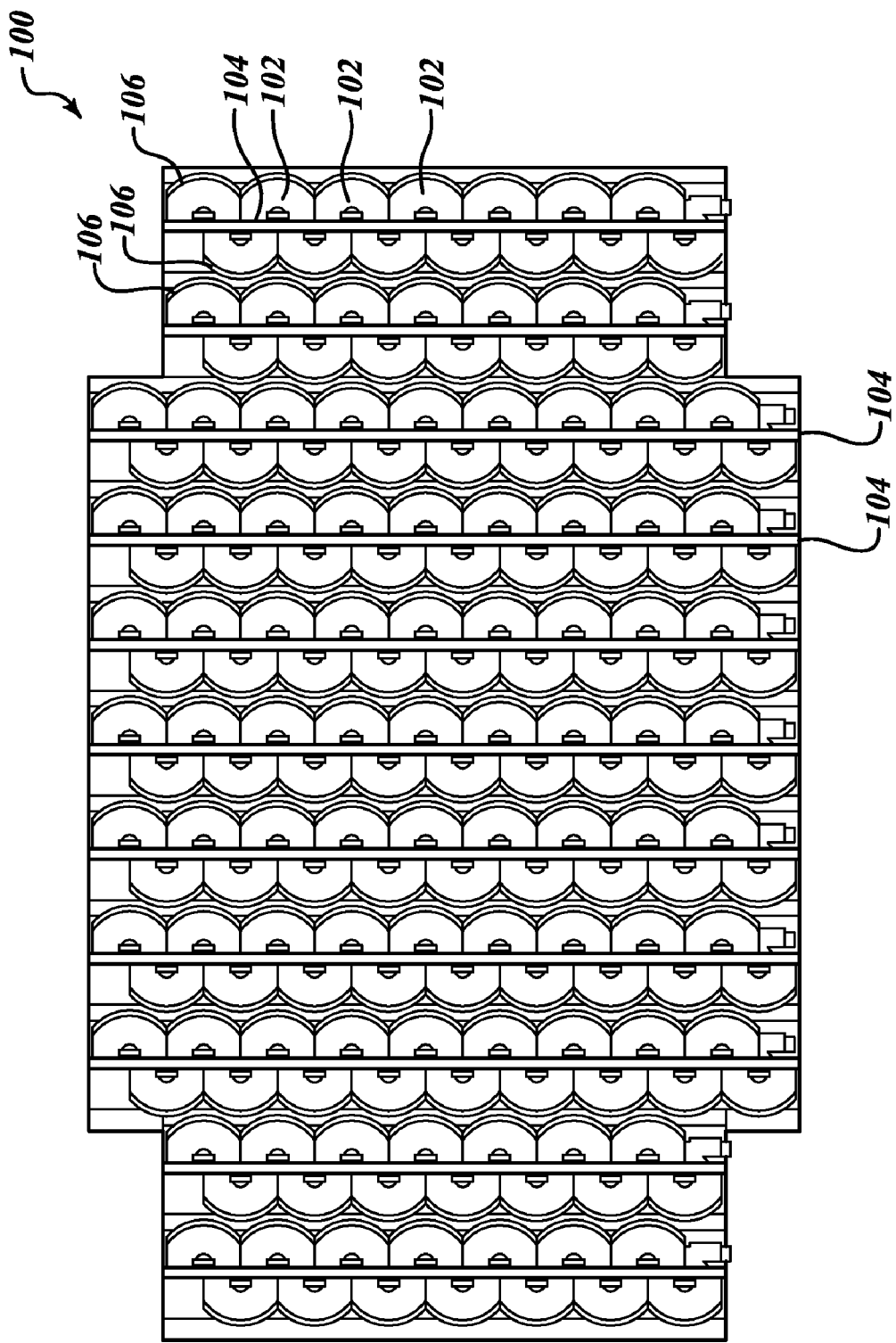
FIG. 1 shows a front view of an example high-intensity floodlight.

FIG. 1 shows a front view of an example high-intensity floodlight 100. The high intensity floodlight includes a plurality of blades 104. The blades 104 are, in one embodiment, circuit cards to power and control the LEDs 102, but in alternate embodiments, the LEDs 102 may be mounted onto a heat spreader, or a thermal board made up of high conductive thermal materials. The LEDs 102 are mounted on each side of the blades 104, but may also be mounted only on one side of the blades 104 and are perpendicular to the direction of the floodlight 100 designed light output. A reflector 106 is mounted on the blade 104 behind the LED 102 in order to reflect the light towards the floodlights 100 designed output. The reflector 106 may be injection molded onto the blade 104 in alternate embodiments.

Figure 2:
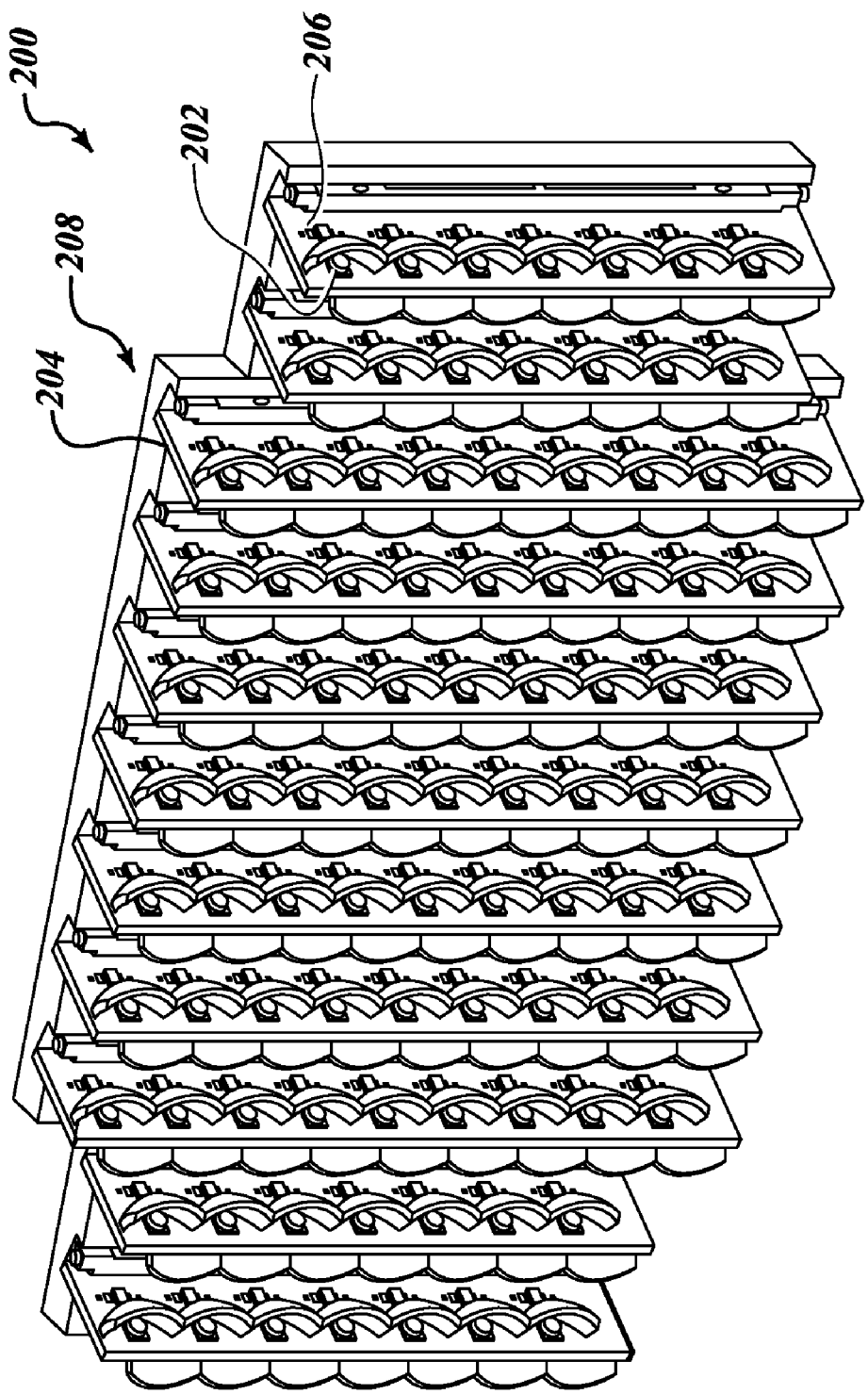
FIG. 2 shows a three dimensional view of an example high-intensity floodlight.

FIG. 2 shows a three dimensional view of an example high-intensity floodlight 200. A plurality of LEDs 202, and reflectors 206 are mounted onto blades 204. The blades 204 are thermally coupled to a heat sink 208. The heat sink 208 draws heat from the blades 204 and dissipates the heat away from the LEDs 204.

Figure 3:
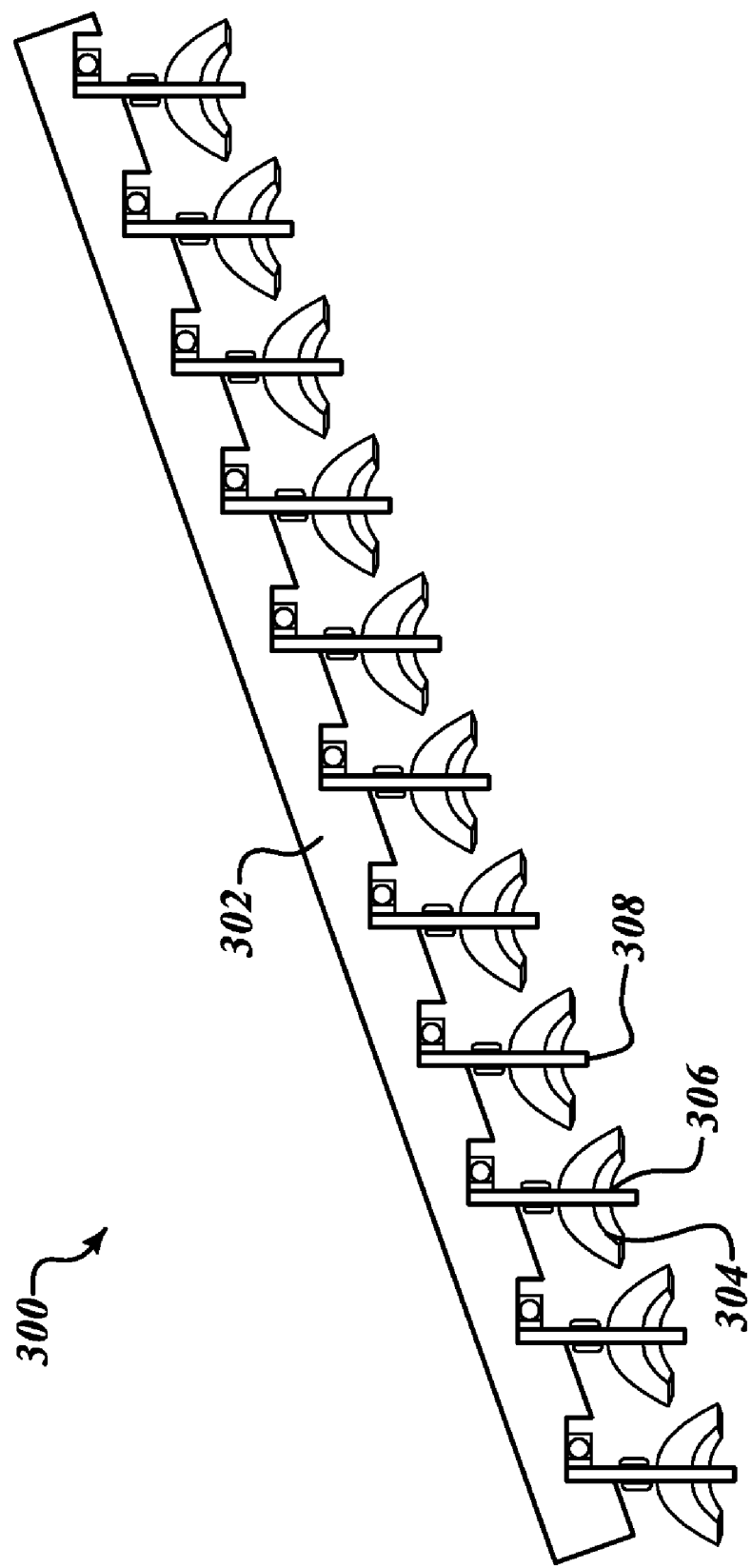
FIG. 3 shows a top view of an example high-intensity floodlight.

FIG. 3 shows a top view of an example high-intensity floodlight 300. The flood light 300 has a plurality of parallel blades 308, with LEDs 306 and reflectors 304. In alternate embodiments, there may be LEDs 306 and reflectors 304 on only one side of the blades 306. The blades 306 are thermally mounted to a heat sink 302 in order to dissipate heat away from the LED lights.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are define as follows:

1. A high intensity light emitting diode floodlight, the floodlight having a designed direction of output, comprising:

a plurality of light emitting diodes;

a plurality of optical elements;

a plurality of blades comprising opposing sides having normal vectors perpendicular to the designed direction of output and the normal vectors are approximately parallel to each other, each of the blades having a free end and a fixed end; and a heat sink thermally coupled to the fixed end of each of the blades, configured to dissipate heat away from the light emitting diodes, wherein each of the sides receives a plurality of the light emitting diodes and optical elements, wherein a single optical element is mounted adjacent to a single light emitting diode in order to reflect light produced by the light emitting diode in the designed direction of output.

2. The high intensity light emitting diode floodlight of claim 1, wherein the blade is a circuit board.

3. The high intensity light emitting diode floodlight of claim 1, wherein the blade is a thermally conductive board.

4. The high intensity light emitting diode floodlight of claim 1, wherein the plurality of light emitting diodes located on a first one of the sides are arranged at a predefined distance from the free end of the respective blade.

5. The high intensity light emitting diode floodlight of claim 4, wherein the plurality of light emitting diodes located on a second one of the sides are arranged at a predefined distance from the free end of the respective blade.

6. The high intensity light emitting diode floodlight of claim 5, wherein the plurality of light emitting diodes located on the sides are arranged along an axis perpendicular to the designed direction of output, wherein the plurality of light emitting diodes located on the first side are not collocated along the axis as the plurality of light emitting diodes located on the second side.

7. The high intensity light emitting diode floodlight of claim 6, wherein one or more of the light emitting diodes located on the first side are located on the axis at approximate midway points along the axis between two light emitting diodes located on the second side.

* * * * *